United States Patent

[11] 3,585,420

| [72] | Inventor | Meredith C. Gourdine<br>West Orange, N.J. |
|---|---|---|
| [21] | Appl. No. | 837,731 |
| [22] | Filed | June 30, 1969 |
| [45] | Patented | June 15, 1971 |
| [73] | Assignee | Gourdine Systems, Incorporated<br>Livingston, N.J.<br>Division of Ser. No. 601,270, Nov. 15, 1966, which is a continuation-in-part of Ser. No. 512,083, Dec. 7, 1965, abandoned. |

[54] ALTERNATING CURRENT SYSTEMS EMPLOYING MULTIPLE ELECTROGASDYNAMIC DEVICES
1 Claim, 7 Drawing Figs.

[52] U.S. Cl. .................................................. 310/10
[51] Int. Cl. .................................................. H02n 3/00
[50] Field of Search .......................................... 310/5, 6, 10, 11; 103/1 E

[56] References Cited
UNITED STATES PATENTS
| 3,419,738 | 12/1968 | Paulin et al. | 310/11 |
| 3,440,458 | 4/1969 | Knight | 310/11 |

*Primary Examiner*—D. X. Sliney
*Attorney*—Brunbaugh, Graves, Donohue & Raymond

ABSTRACT: Systems for effecting a conversion between the energies of a gas and electrical energy and employing at least two electrogasdynamic (EGD) devices each having ionizing electrodes and an output electrode for connection to an external circuit. Each EGD device is connected in series with the external circuit and the amount of electrical energy available for transfer to or from the circuit from each converter is periodically varied so that an alternating current potential is maintained at the output electrode during operation. Periodic variation is achieved by varying an electrical ionizing source for the ionizing electrodes, or by varying gas flow through each EGD device.

INVENTOR.
MEREDITH C. GOURDINE

ATTORNEYS

INVENTOR.
MEREDITH C. GOURDINE

ATTORNEYS

ALTERNATING CURRENT SYSTEMS EMPLOYING MULTIPLE ELECTROGASDYNAMIC DEVICES

CROSS-REFERENCES TO RELATED APPLICATIONS

This is a division of my copending application Ser. No. 601,270 for "Electrogasdynamic Systems and Methods," filed Nov. 15, 1966, which in turn is a continuation-in-part of application Ser. No. 512,083, filed Dec. 7, 1965 and now abandoned.

BACKGROUND OF THE INVENTION

This invention relates to electrogasdynamic conversion systems employing two or more electrogasdynamic converters operable on a stream of gas for developing or utilizing an alternating current potential at output electrodes connected to an external circuit.

In my copending application Ser. No. 389,360, filed Aug. 13, 1964 for "Electrogasdynamic System," I disclose improved electrogasdynamic (EGD) converters which are capable of generating an alternating current potential. In those converters the output (collector) electrode of the converter is connected to an external circuit which is tuned to a desired frequency of oscillation and which regeneratively couples to ionizing electrodes of the converter a portion of the alternating current energy in order to sustain electrical generation.

In my copending application Ser. No. 794,273, filed Jan. 27, 1969 for "Electrogasdynamic Generating Systems," I disclose yet another system for producing an alternating current potential by coupling together two EGD converters through a relaxation circuit. The present invention is intended to provide alternate systems which are capable of operating with an alternating current potential, and which employ two or more EGD converters in single or multiple phase connections. In the present systems, however, each converter may be separately controlled in synchronism with other converters in the system to produce (or operate on) an alternating current voltage, thus making the system adaptable to many applications and giving it greater flexibility.

SUMMARY OF THE INVENTION

In brief, the invention includes the connection of EGD converters to an external circuit, such as a load, and alternately or sequentially exciting and deexciting the converters. Depending on the requirements of the system, two or more converters may be connected in series with the circuit such that the converters are serially connected to the external circuit when excited. For multiphase operation, various other forms of connection are provided and may include a number of converters equal to or greater than the number of phases upon which the system is to operate. In the multiphase systems, the sequence and rate of converter excitation and deexcitation is selected in accordance with the number of converters used. In preferred embodiments either an exciting source for the converter ionizing electrodes or the working gas stream for the converter is periodically interrupted to thereby periodically interrupt (modulate) the electrical energy transferred to or from the converter collector electrode.

BRIEF DESCRIPTION OF THE DRAWINGS

For a better understanding of these and other aspects of the invention, as well as the objects and advantages thereof, reference may be made to the following detailed description and to the drawings, in which:

There are several ways in which an electrogasdynamic system may be made to operate in the alternating current mode so that the system either produces alternating current electrical energy, or operates on alternating current energy to produce correspondingly modulated fluid flow if the EGD system is a pump. FIG. 1 depicts an EGD alternating current system in which individual EGD converters, which may be of the type described in the above-noted application Ser. No. 601,270, are arranged to be alternately coupled to and decoupled from an external circuit, represented by a load 70. In such converters, a working gas, such as air, is passed down a flow path having a pair of ionizing electrodes at an upstream end and a collector electrode at a downstream end separated from the upstream end by a substantially nonconducting flow path boundary. Electrical charges injected into the flow by the ionizing (corona and attractor) electrodes are carried downstream by the flow to the collector electrode, where discharge occurs, against an axial electric field terminating at the collector electrode.

In FIG. 1 and subsequent FIGS. the converters are represented by a triangular symbol, the peak thereof being the collector electrode and therefore also indicating the direction of ion flow through the converter channel. The base of the triangle depicts a connection terminal at the point to either the corona electrode or the attractor electrode, the terminal at the side of the triangle being the other connection to the other of these electrodes. The polarity markings indicate the polarity of the potential across the converter when it is operating.

Figure 1:
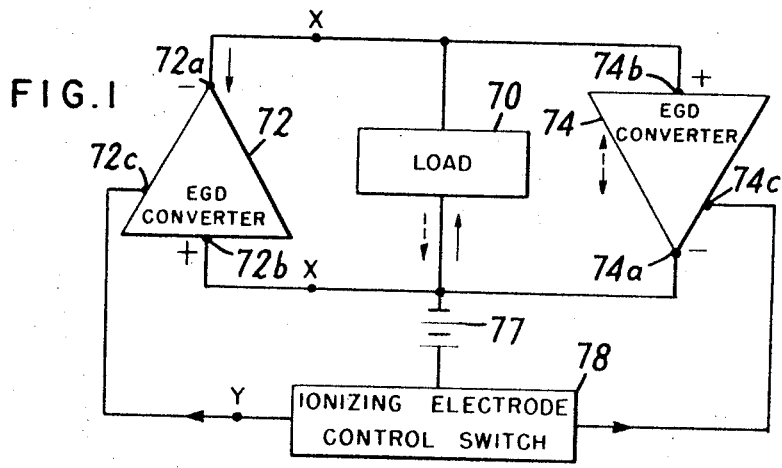
FIG. 1 is an electrical schematic view of an electrogasdynamic system for effecting an energy conversion between a stream of fluid and alternating current electrical energy.

As shown, each of the converters 72, 74, considered separately, is connected in series with the external circuit. The collector electrodes 72a, 74a and corona electrodes 72b, 74b are connected to opposite sides of the load 70. By sequentially controlling the converters 72, 74, the system can be operated in the alternating current mode, the arrows indicating the direction of current flow when the converters are operating. To control the converters, either electrical or mechanical actuation may be employed. The scheme for electrical control is illustrated in FIG. 1. This is accomplished by alternately interrupting the direct current power source 77 to the attractor electrodes 72c, 74c of the respective converters by means of an ionizing electrode control switch 78, thereby causing a modulation of the electrical energy transferred to the load. This switch 78 may be, for example, an electronic device or two or more switches (not shown) which are actuated by a rotating cam and have contacts to open and close the supply circuit to the attractor electrodes 72c, 74c at the desired alternating current rate. For single-phase operating, the switching sequence is arranged such that the converter 72 conducts during one-half of the alternating current cycle and the converter 74 conducts during the other half of the cycle. The EGD converter is essentially a device which has infinite impedance when inoperative, so that when the switch 78 interrupts the ionization current to the electrodes, no ions are conducted through the converter channel(s) and the converter becomes electrically isolated from the remainder of the circuit. Upon reapplication of the ionizing potential from the source 77, ion conduction is again initiated, providing a series path for current through the converter and load.

It is understood, of course, that although only one electrode pair of each converter is illustrated, more electrode pairs may be associated with each converter and may or may not be periodically deenergized by the switch 78 to electrically isolate the converter. Additionally, it is apparent that "isolation"

need not be complete, in order to realize an AC potential across the external circuit 70, since in effect, all that is required is a modulation of the energy transferred between the converter and the external circuit. By way of example, if the converters were supposed to contain several series stages, an AC voltage could be obtained by periodically cutting off the ionization potential to some of the intermediate ionizing electrodes in the EGD flow channel.

The foregoing system, of course, can also be used as a fluid pump in which fluid is propelled alternately through the channels of the two converters. In this event, the load 70 is replaced by direct current power source, as discussed earlier, and (depending on the polarity of the voltage source applied) electrode connections reversed.

Figure 1A:
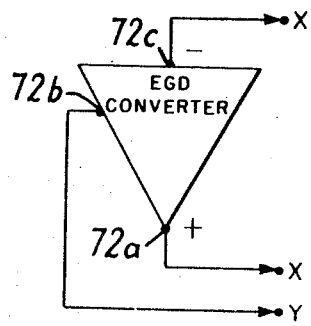
FIG. 1A is a schematic view of a modification of the FIG. 1 system.

FIG. 1A shows an alternate form of the FIG. 1 system. Here, the left-hand converter 72 is conductive of positive rather than negative ions and hence, the connections to the ionizing electrodes and the connections x–x are reversed.

Figure 2:
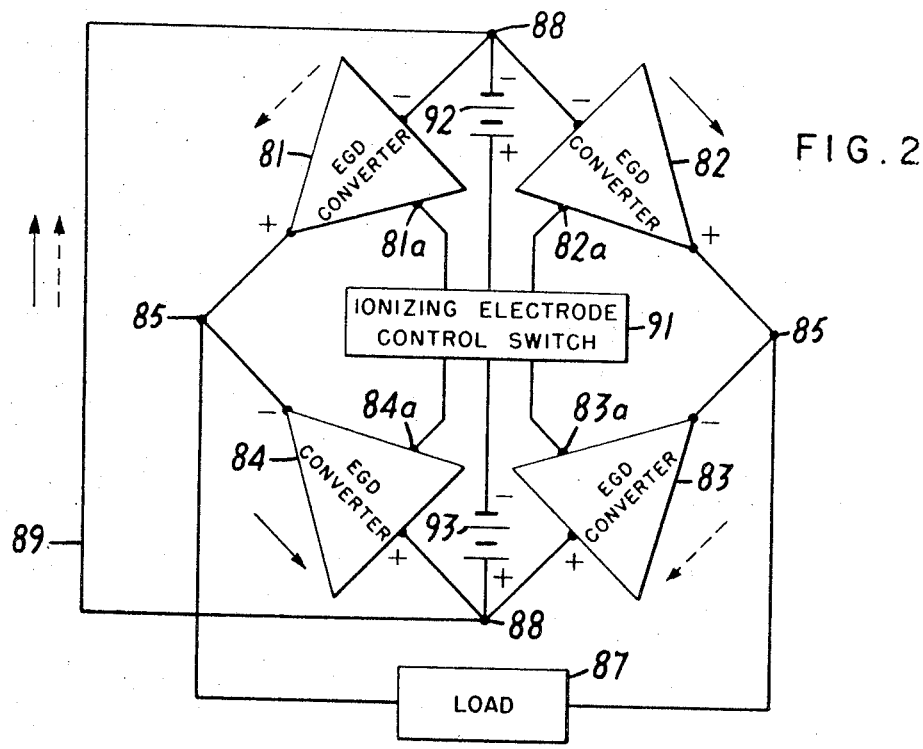
FIG. 2 is a schematic representation of a further form of alternating current EGD system.

In FIG. 2, the four converters 81, 82, 83 and 84 are arranged in a bridge circuit to provide AC voltage across the output terminals 85 to which the load 87 is connected. The input terminals are electrically coupled through the conductor 89 such that a series current path including opposite legs of the bridge and the load exists. The control switch 91 sequentially breaks the circuit between the ionizing voltage sources 92 and 93 and the electrodes 81a—84a. During one-half of the AC cycle, current flow is through the converters 82 and 84, and through the converters 81 and 83 for the other half of the cycle.

Figure 3:
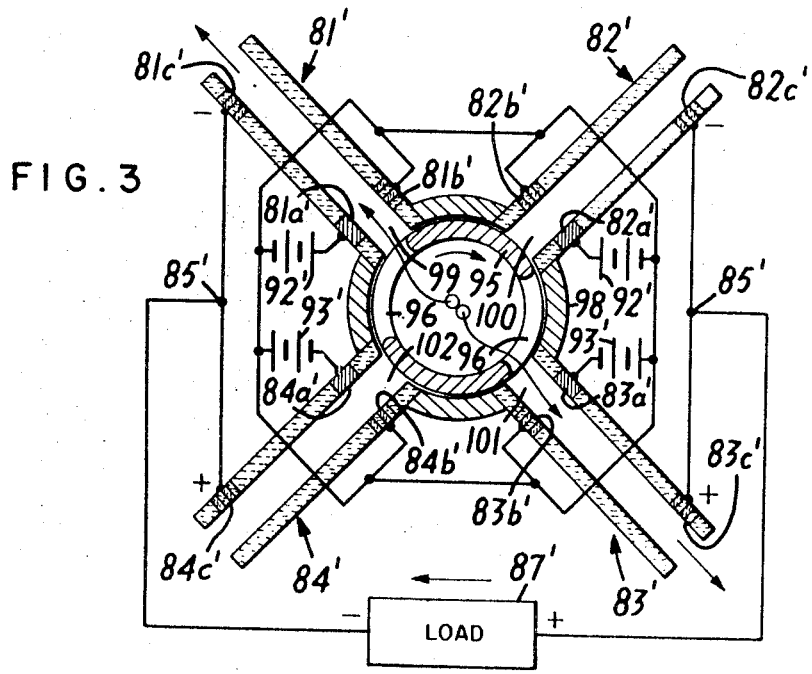
FIG. 3 is a schematic representation of a mechanical valve suitable for operation with the system of FIG. 1.

FIG. 3 depicts, in cross section, an EGD system including a mechanical fluid flow control valve which may be used in conjunction with the AC EGD system disclosed herein. In this system, the fluid flow to the converters is periodically interrupted so that the flow rate is modulated. In this case the ionizing electrodes of the respective converters are continually excited. The valve, illustrated schematically, includes a rotary element in the form of a cylinder 95 having a pair of diametrically opposed apertures 96 and rotatable within a sleeve 98. As the system is arranged, it is the analogy of the FIG. 2 bridge circuit, and like numbers (primed) have been assigned to the same elements. The converters 81'—84' are represented diagrammatically by a single flow channel, each having a corona discharge electrode 81b'—84b', an attractor electrode 81a'—84a' and a collector electrode 81c'—84c'. The inlets 99, 100, 101 and 102 to the converters open into the sleeve 98 such that when the cylinder 95 rotates, the apertures 96 periodically communicate with the converter channels. Fluid is introduced axially of the apertured sleeve 98 and is directed by a closed end of the cylinder 95 (not shown) into the respective flow channels when the inlets and apertures 96 are in alignment. The arrows indicate the general direction of fluid flow when the converters 81' and 83' are operating.

The system shown in FIG. 2 can also be extended to multiphase operation by connecting additional converter pairs to the terminals 88, in the same manner illustrated for the converters 82 and 83, for example. The terminals formed between and added pairs constitute the other output terminals to the multiphase load, and the control switch 91 will be similarly connected also. The switching sequence, of course, will be determined by the number of phases.

The wave form of the alternating current through the load 87' can be controlled by the shape of the apertures 96. It is understood, of course, that the operation of the system would be identical if the inlet and outlet positions of one of each converter pair were reversed such that fluid flow would be unidirectional through both converters. In this case, fluid would be introduced at the inlet of only one of the opposed converters. In either case, it is apparent that by modulating the flow volume through the converters, the ion concentration in the channels and output voltage will be correspondingly modulated.

It will be appreciated that other forms of the movable valve element 95 may be used in place of the apertured cylinder. For example, a rotary disc having slots or holes at its periphery can be used in conjunction with converters whose inlets are arranged such that the peripheral openings in the disc periodically sever the fluid stream.

Figure 4:
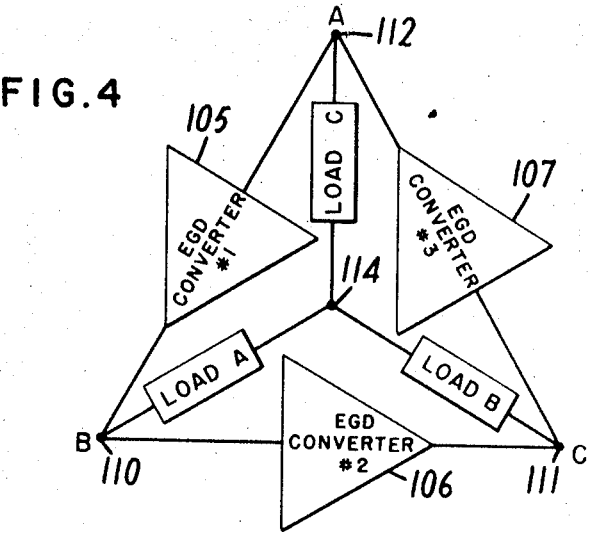
FIG. 4 is an electrical schematic view of a three-phase alternating current electrogasdynamic system.
Figure 5:
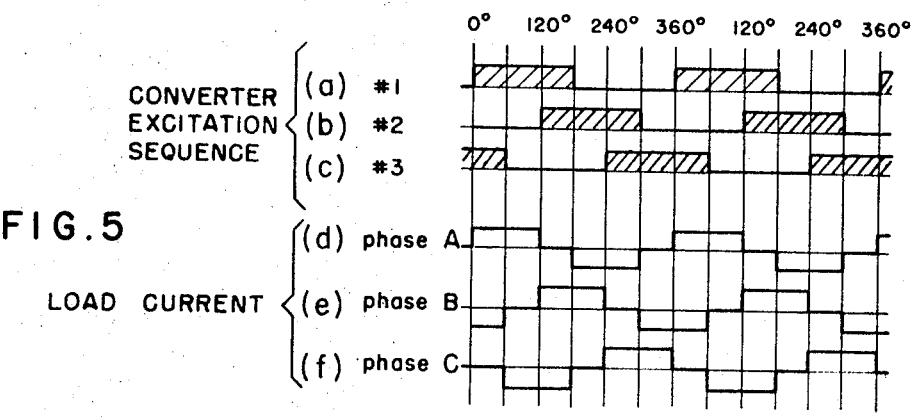
FIG. 5 is a graph of the switching sequence and load current wave forms useful in explaining the operation of the system of FIG. 4.

In FIG. 4, the converters 105, 106 and 107 are serially coupled in a delta connection whereby the junctions 110, 111, 112 in the series paths between converters constitute output terminals for a three-phase load A, B, C, having a common load terminal 114. As in the case of the single phase AC systems, the voltage can be alternated periodically modulating in sequence the electrical energy transferable from the respective converters to the external load, either by use of a flow control valve or of an ionizing and electrode control switch. For simplicity, the ionizing and collector electrodes, as well as the switch (or valve) have been omitted from the drawing. It will still be appreciated, however, that connections to or physical placement of the converters are identical or similar to those shown, for example, in FIGS. 1 or 2.

Where ionizing electrode switching is employed, the switching sequence may be such that each converter conducts current during approximately ½-cycle periods which are displaced in time by 360/N electrical degrees, where N is the number of electrical phases. FIG. 5 shows the switching and load current sequence for the FIG. 4 system. The ionizing potentials are applied to the respective ionizing electrodes during the shaded periods in graphs a, b and c. This sequence gives a load current as shown in graphs d, e and f, each being displaced by 120 electrical degrees.

Figure 6:
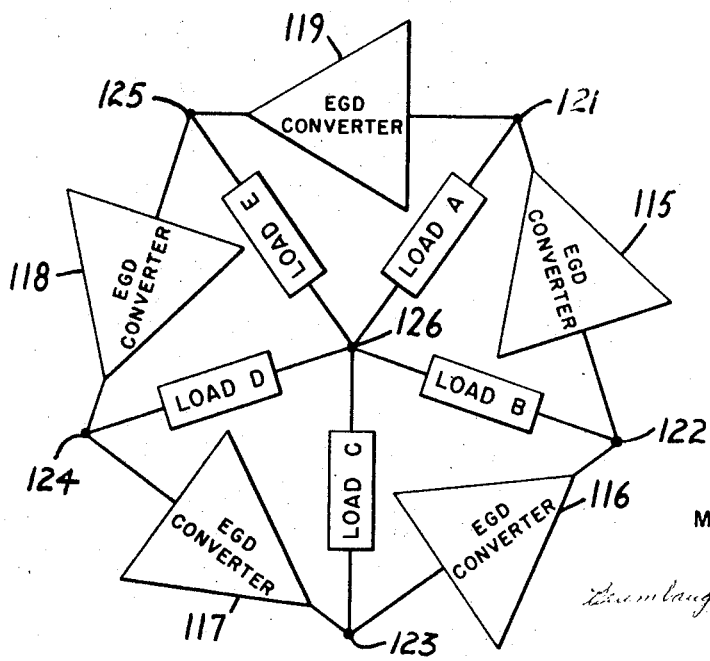
FIG. 6 is an electrical schematic view of another electrogasdynamic system operable with multiphase alternating current electrical energy.

FIG. 6 shows the electrical connections for a five-phase load excited by five EGD converters 115, 116, 117, 118, 119. This connection is analogous to the one shown in FIG. 4. One side of each phase load is coupled to a junction 121, 122, 123, 124, 125 in the series paths between converters. The other sides of the phase loads share a mutual load terminal 126. Again, both the fluid flow valve and electric switching are compatible with this system to develop the multiphase voltage.

I claim:
1. Electrogasdynamic systems for effecting a conversion between the energy of a stream of fluid and alternating current electrical energy comprising, in combination:
   first and second electrogasdynamic converters each operable on a stream of fluid and including a flow channel for the stream, and collector electrode means situated in relation to the ionizing electrodes to collect ions from the stream, said collector electrode means of each converter is connected to one side of an external circuit and one of the electrodes of the ionizing electrode pair of each converter is connected to the other side of an external circuit;
   means for connecting each of the converters in series with an external circuit;
   voltage source means connectable to the ionizing electrodes of the converters to produce ionizing fields in the respective streams, said voltage source means being connectable to one of the converters to produce positive ionization of the stream, and connectable to the other of the converters to produce negative ionization of the stream; and
   means effective on the converters to periodically modulate in alternation the amount of electrical energy available for transfer between the respective converters and the external circuit.